United States Patent [19]

Hayes

[11] Patent Number: 4,886,844
[45] Date of Patent: Dec. 12, 1989

[54] POLYAMIDE RESIN DISPERSIONS AND METHOD FOR THE MANUFACTURE THEREOF

[75] Inventor: Michael E. Hayes, Fernandina Beach, Fla.

[73] Assignee: Union Camp Corporation, Wayne, N.J.

[21] Appl. No.: 151,733

[22] Filed: Feb. 3, 1988

[51] Int. Cl.$^4$ .............................................. C08K 7/16
[52] U.S. Cl. ..................... 523/223; 524/253; 524/538; 524/606; 524/607
[58] Field of Search ............... 523/223; 524/253, 538, 524/606, 607

[56] References Cited

U.S. PATENT DOCUMENTS

| | | | |
|---|---|---|---|
| 3,844,991 | 10/1974 | Ferraro | 524/608 |
| 4,123,403 | 10/1978 | Warner | 524/608 |
| 4,172,066 | 10/1979 | Zweigle et al. | 523/223 |
| 4,247,434 | 1/1981 | Lovelace et al. | 523/223 |
| 4,371,636 | 2/1983 | Distler et al. | 523/223 |

FOREIGN PATENT DOCUMENTS

| | | | |
|---|---|---|---|
| 520332 | 1/1956 | Canada | 524/608 |
| 557649 | 5/1958 | Canada | 524/608 |
| 557651 | 5/1958 | Canada | 524/608 |

Primary Examiner—Morton Foelak
Attorney, Agent, or Firm—Edward J. Sites

[57] ABSTRACT

A method is provided for the preparation of stable aqueous dispersions of non-solvated, un-neutralized, low amine, low acid number polymerized fatty acid polyamide resins. In the preferred method of this invention, a polymerized fatty acid polyamide resin which has been prepared so as to have a low acid and low amine number is liquified by heating the polyamide resin to a temperature where it is at or above its melting point. The liquified polymerized fatty acid polyamide resin is then blended with a predetermined amount of water which is heated to a temperature such that the resulting blend will have a temperature above the melting point of the polyamide resin. A cationic surfactant which is the salt of the amine of the formula:

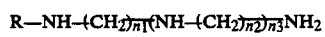

$$R-NH-(CH_2)_{n_1}(NH-(CH_2)_{n_2})_{n_3}NH_2$$

wherein R represents an alkyl having 16–20 carbon atoms and $n_1$ and $n_2$ are the same or different and each represents a whole number from 1–3 and $n_3$ is 0 or 1, is included in the mixture. The resulting mixture is then subjected to sufficient comminuting forces to form an emulsion in which droplets of the polyamide resin have a volume average size distribution of about 20 microns or less in diameter and preferably 5 microns or less. The resulting emulsion is then cooled to a temperature below the melting point of the polyamide resin causing the emulsified droplets of the polyamide resin to solidify as finely divided particles which are dispersed uniformly through the aqueous phase. The resulting stable aqueous dispersions of the polymerized fatty acid polyamide resin which are obtained are especially useful for hot melted adhesive applications, when utilized in coatings, inks, and the like.

9 Claims, No Drawings

POLYAMIDE RESIN DISPERSIONS AND METHOD FOR THE MANUFACTURE THEREOF

This invention relates to aqueous dispersions of polyamide resins and more particularly is concerned with stable aqueous dispersions of non-solvated, un-neutralized low acid, low amine number, polymerized fatty acid polyamide resins and the method for the manufacture thereof.

BACKGROUND OF THE INVENTION

Polyamide resins are a well known class of resins as is the general method for their preparation. Polyamide resins are typically manufactured by reacting a di- or polyfunctional amine with a di- or polyfunctional acid. Most of the diacids and diamines which are commonly employed to form polyamide resins which are essentially linear. The physical properties of the polyamide resins will vary considerably depending upon the particular starting reactants used to form the polyamide resin. Polyamide resins which are prepared from relatively short chain diacids and diamines having, for example, 5–10 carbon atoms will tend to be relatively crystalline and have excellent fiber forming properties. These types of polyamide resins are typically referred to as nylons.

Polyamide resins are also prepared from relatively long chain polyfunctional acids and diamines. A particularly important class of polyamide resins of this type are referred to as polymerized fatty acid polyamide resins. The polyfunctional acids used in the preparation of the polymerized fatty acid polyamide resins are derived from higher unsaturated fatty acids by polymerization. In the polymerization process, fatty acids having double bond functionalities combine to produce a mixture of higher polymeric acids. The polymerized fatty acid polyamide resins are typically prepared by reacting one or more suitable diamines, most commonly relatively short chain diamines, with the polymerized fatty acid. Often another diacid is reacted to increase the softening point or other properties. The polymerized fatty acid polyamide resins which are obtained tend to be more amorphous than the nylon type of polyamides resins and are generally more flexible. The differences in the physical properties of the polymerized fatty acid polyamide resins as compared to the nylon type of polyamide resins are considered to be related to the long chain length of the polymerized fatty acid component.

The polymerized fatty acid polyamide resins are widely used in a variety of industrial applications. Polymerized fatty acid polyamides are especially useful as hot melt adhesives and for forming water and solvent resistant coatings on substrates such as paper. An important related use of polymerized fatty acid polyamide resins is as binders in printing inks and the like where the excellent film toughness, flexibility and adhesion are all important properties.

One of the problems encountered with the polyamide resins and particularly the polymeric fatty acid polyamides is concerned with the methods used to apply the polyamide resins to substrates. One method which has been suggested is to heat the polyamide resins above their melting point and then to apply the molten resin to the substrate. This has certain inherent problems in that polyamide resins typically have high melting points, which often are higher than the deformation temperatures of the substrates on which it is desired to apply the molten polyamide resin. The hot melt method accordingly can only be used in certain limited applications and even these applications require relatively expensive application equipment. The use of molten polyamide resins is not practical in many common applications as, for example, in printing. Another example of where it is impractical to use molten polyamide resins is when the polyamide resin is intended to be applied as a latent hot melt layer to be activated at a later time. An example of this type of application is where the polyamide resin is desired to be applied to a textile interliner so that after the garment is completely assembled the hot melt adhesive can be activated to hold the assembled parts of the garment in position.

It was recognized in the art that certain of the problems associated with the polyamide resins could be solved if the polyamides could be applied at ambient temperatures from a solution or a dispersion. Suggestions were made to form organic solvent solutions of the polyamide resins. It was found, however, that for many applications this was unsatisfactory. Polyamide resins as a class have excellent resistance to solvents and even with respect to those solvents in which the polyamide resins are soluble the solubility typically is relatively low. Furthermore, the solvents which were used to make the polyamide resin solutions often adversely reacted with the substrates on which the polyamide resin solutions were applied. A further problem associated with solvent solutions was that the solvents which were used were relatively expensive, were often difficult or impossible to remove from the applied coatings and, the solvent presented fire, toxicity and environmental pollution problems.

To overcome, or at least somewhat reduce, the problems associated with solvent solutions of polyamide resins it was suggested to prepare emulsions or dispersions of the polyamide resins. The emulsions were prepared by initially dissolving the polyamide resin in an organic solvent and then by using selected emulsification agents form an emulsion of the solvent solution and water. The resulting solvent/water polyamide resin emulsions still had the problems associated with the presence of solvents as noted above for the solvent solutions and were relatively unstable. In addition, films formed from the emulsions tended to have an undesirable tackiness.

In British patent No. 1,491,136 there was disclosed a method for forming aqueous dispersions of various plastic powders, including polyamide resin powders. In the disclosed method, the polymer resin was first mechanically reduced to a powder form and then blended with water and a thickening agent. This method was less than satisfactory. The mechanical reduction of the resins to the required particle size was both expensive and difficult to control and often caused thermal degradation of the polymers. Furthermore, the resulting thickened dispersions had limited utility in many applications because of the relatively high viscosity and the presence of the thickening agent.

It was also suggested in the prior art to chemically modify the polyamide resins so as to include solubilizing groups to make the modified resins more readily dispersible in water. This included, for example, incorporating groups such as alkoxymethyl as disclosed by Carirns in U.S Pat. No. 2,430,860 and a related patent by Watsen et al in U.S. Pat. No. 2,714,075. The incorporation of the additional groups into the polyamide resin increased the cost of the polymer and also typically reduced the desirable properties of the polyamide resins especially in relation to water and solvent resistance.

Another method which was suggested for increasing the water dispersibility consists of forming the polyamide resin so that there is a considerable excess of either free carboxyl or free amine groups. At least a portion of the free acid or free amine groups were then neutralized to form salt group on the polyamide resin. The resulting salt groups on the polyamide resin then acted as an internal surfactant which facilitates the dispersion of the modified polyamide in water. In Wittcoff et al U.S. Pat. No. 2,811,459 there is disclosed a method to form polymerized fatty acid polyamide dispersions wherein the polyamide is formed from a substantial excess of a diamine. The resulting polyamide resin is then dispersed in an aqueous solution of an acid so that the acid forms salt groups which act as the internal surfactant to allow formation of an aqueous dispersion. In Wittcoff et al U.S. Pat. No. 2,768,090 a similar process to that described above is disclosed wherein the excess amine groups of a polyamide resin are reacted with an acid to form intrinsic ammonium salt groups so as to be able to form a cationic dispersion which then is converted to an anionic dispersion by charge inversion. A similar salt forming process utilizing free amino groups was disclosed in Wittcoff U.S. Pat. No. 2,824,848. In Wittcoff U.S. Pat. No. 2,926,117 there is disclosed a method wherein the polyamide resin formed with a deliberate excess of acid groups is then dispersed in an aqueous medium containing an alkaline substance to thereby cause formation of salt groups to act as internal surfactants.

The above described methods for preparing aqueous dispersions of polymerized fatty acid polyamides where the polyamide is synthesized with substantial amounts of free amine or carboxylic acid groups, which are thereafter converted to their respective salt groups, is a relatively effective method for initially forming aqueous dispersions, but the dispersion have limited stability and are not satisfactory for use in many applications. These processes require the presence of substantial amounts of free acid or free amino groups for the salt formation. This has a definite adverse effect on the properties of the dispersed polyamide resin. The polymerized fatty acid polyamide resins are especially useful in products such as hot melt adhesives, water resistant coatings, printing inks and the like because of their physical properties including high strength, excellent flexibility, water and solvent resistancy, and the ability to form smooth non-tacky coatings. The optimum desired properties are achieved by conducting the amidations so as to cause as complete as a reaction as possible. This requires that approximately stoichiometric amounts of the starting diacid and diamine be employed and that the reaction be conducted so as to allow for complete reaction and formation of the amide groups so that the final product will have a low amine and low acid number. The presence of substantial excesses of either reactant or the incomplete reaction, as required for the prior art salt forming polyamide material, inherently reduces the chain length and the resulting strength and flexibility of the polyamide resin. It is also highly desirable in many applications where the polymeric fatty acid polyamide resins are employed, such as in hot melt applications or in coating applications, that the polyamide which is used be stable with regard to temperature and storage and have a narrow melting point range. These particular properties are best obtained with a completely reacted polyamide resin. The polymerized fatty acid polyamide resins with substantial amounts of free acid and amino groups such as those used in the prior art processes are unstable for these applications in that the modified polyamide resins continue to react during application which causes increases in the molecular weight, increases in the coating viscosities, and changes in the melting point. A still further problem encountered with the method wherein the salt forms of the polyamide resins are used is that the salts tend to decompose during application and the resulting material when applied becomes undesirably tacky. This is particularly undesirable in many applications such as in printing inks and protective coatings. Furthermore, because of the relative instability of the materials caused by substantial excess amounts of unreacted polymerized fatty acids in the polymer the fatty acids can be liberated from the polymer and cause exceptional tackiness and undesirable degradation of the desired properties of the polyamide resin. Because of the problems associated with the polymerized fatty acid polyamide resins having the salt groups formed as part of the polymer, the aqueous dispersions of these particular types of resins have had no substantial commercial success.

Accordingly, it would be highly advantageous if a method could be provided for forming stable aqueous dispersions of non-solvated, un-neutralized, low acid, low amine number polymerized fatty acid polyamide resins.

SUMMARY OF THE INVENTION

A method is provided for the preparation of stable aqueous dispersions of non-solvated, un-neutralized, low amine, low acid number polymerized fatty acid polyamide resins. In the preferred method of this invention, a polymerized fatty acid polyamide resin which has been prepared so as to have a low acid and low amine number is liquified by heating the polyamide resin to a temperature where it is at or above its melting point. The liquified polymerized fatty acid polyamide resin is then blended with a predetermined amount of water which is heated to a temperature such that the resulting blend will have a temperature above the melting point of the polyamide resin. A cationic surfactant which is the salt of an amine of the formula:

wherein R represents an alkyl having 16–20 carbon atoms and $n_1$ and $n_2$ are the same or different and each represents a whole number from 1–3 and $n_3$ is 0 or 1 is added to the mixture in an amount which will promote the emulsification of the polyamide resin and water. The resulting mixture is then subjected to sufficient comminuting forces to form an emulsion in which droplets of the polyamide resin which have a volume average size distribution of about 20 microns or less in diameter and preferably 5 microns or less. The resulting emulsion is then cooled to a temperature below the melting point of the polyamide resin causing the emulsified droplets of the polyamide resin to solidify as finely divided particles which are dispersed uniformly through the aqueous phase. The resulting stable aqueous dispersions of the polymerized fatty acid polyamide resin which are obtained are especially useful when applied as coatings for hot melted adhesive applications, or utilized in coatings, inks, and the like.

DETAILED DESCRIPTION OF THE INVENTION

The polyamide resins which are used to form the aqueous dispersions of the present invention are polymerized fatty acid polyamide resins which have low acid and low amine numbers. The polymerized fatty acid polyamide resins which are suitable for use in this invention can be obtained commercially or can be prepared by generally well known methods.

The term "polymerized fatty acid" as used hereinafter in this specification is intended to be generic in nature and refers to polymerized acids obtained from fatty acids. The term "fatty acids" refers to saturated, ethylenically unsaturated and acetylenically unsaturated naturally occurring and synthetic monobasic aliphatic carboxylic acids which contain from 8 to 24 carbon atoms.

For purposes of facilitating the explanation of this invention, specific references will be made to polymerized fatty acid polyamide resins which are obtained from C-18 fatty acids; but it should be appreciated that the method of this invention can likewise be employed with other polymerized fatty acid polyamides within the scope of this present invention.

The preferred starting acids for the preparation of the polymerized fatty acids used in this invention are oleic and linoleic acids because of their ready availability and relative ease of polymerization. Mixtures of these two acids are found in tall oil fatty acids making commerical tall oil fatty acids a convenient source of the starting materials. The fatty acids can be polymerized using various well known catalytic and noncatalytic polymerization methods. The typical composition of the polymerized fatty acids based on the C-18 tall oil fatty acids which are used as the starting materials for the polyamide resins used in the present invention is:

| $C_{18}$ | monobasic acids (monomer) | 0–15% by wt. |
|---|---|---|
| $C_{36}$ | dibasic acids (dimer) | 60–95% by wt. |
| $C_{54}$ (or higher) | trimer acid or polybasic acids | 0.2–35% by wt. |

In the preparation of the polymerized fatty acid polyamide resins used in the present invention, it is preferred that the starting polymerized fatty acid contain as high a percentage of the dimer acid, C-36 dibasic acid, as possible in order to obtain the optimum physical properties in the final product.

In addition to the polymerized fatty acids, a wide variety of dicarboxylic acids can be used in the preparation of the polymerized fatty acid polyamide resins used in the present invention, including aliphatic, cycloaliphatic and aromatic dicarboxylic acids. Representative of such acids, which may contain from 2 to 22 carbon atoms, are oxalic, glutaric, malonic, adipic, succinic, suberic, azelaic, pimelic, terephtalic, isophthalic, phthalic, naphthalene dicarboxylic acids and 1,4- or 1,3-cyclohexane dicarboxylic acids. Methods of preparing these preferred acids are well known, and they are readily avialable commercially.

Preferred dicarboxylic acids employed in the invention are straight chain aliphatic diacids having at least 6 carbon atoms and more preferably 6 to 22 carbon atoms such as azelaic, sebacic, 1,18-octadecane dicarboxylic and 1,16-hexadecane dicarboxylic acids, the latter two being most preferred. It should be understood that use of the corresponding acid anhydrides, esters, and acid chlorides of these acids is included in the term "dicarboxylic acid".

The diamines used in the preparation of the polymerized fatty polyamide resins used in the present invention may be one or more of the known aliphatic, cycloaliphatic or aromatic diamines having from about 2 to 20 carbon atoms. Preferred especially are the alkylene diamines. Illustrative of the preferred diamines are ethylene diamine, 1,3-diaminoproapane, 1,4-diaminobutane, terephthalyl diamine, known as p-xylene diamine, 1,6-hexamethylene diamine, 4,4'-methylenebis(cyclohexylamine), 2,2-bis-(4-cyclohexylamine) propane, polyglycol diamines, isphorone diamine, isphthalyl diamine, known as m-xylene diamine, cyclohexanebis(methylamines), 1,4-bis-(2'-aminoethyl)benzene, 4,4'-methylenebis(cyclohexylamine) and piperazine. These diamine compounds are all prepared by well known methods and many are commercially available. Preferred particularly are the straight chain aliphatic diamines of 2 to 20 carbon atoms, especially ethylene diamine and hexamethylene diamine, and cylcoaliphatic diamines, especially 4,4'-methylenebis(cylcohexylamine).

In the method of the present invention, it is desirable to use as the polymerized fatty acid polyamide resin a material which is the result of as complete an amidification reaction as possible between the starting polymerized fatty acid and the diamine. The degree of completion of the amidification process can be determined by evaluating the acid number and the amine number of the final polymer. The term acid number refers to the number of milligrams of potassium hydroxide required to neutralize the free acid in one gram of the polymer. The term amine number refers to the number of milligrams of potassium hydroxide equivalent to the free or excess amine groups present in the final polymer. For purposes of this invention, it would be especially ideal if the amine and the acid numbers of the polyamine resin were each 0. However, it is often difficult, if not impossible, to reach a perfect balance of the amine and carboxylic acid groups in the polyamide. It was found, however, that the polymerized fatty acid polyamide resins having relatively low amine numbers of, for example, up to about 10 and acid numbers up to about 12, are especially useful in the present invention. It is of interest to note that in this regard, using the salt forming methods to form an internal surfactant as disclosed in the prior art on the polyamide resins having low acid and low amine numbers of the type used in the present invention were not readily dispersible and the resulting dispersions were quite unstable.

The number of free acid groups and free amine groups present in the polymerized fatty acid polyamide resin are directly related to the relative amount of the polymeric fatty acids, dicarboxylic acids and the diamines involved in the polymerization reaction and the degree of completion of the reaction. For the above reasons, approximately stoichiometric amounts of the polymerized fatty acids *plus* the total dicarboxylic acids and the diamines based on the total number of available acid and amine groups should be used to prepare the polyamide resins for this invention and the reaction conditions should be selected to ensure completion or substantial completion of the amidation reaction. The reaction conditions required for the amidation reaction are generally well known in the art with the reaction being generally conducted at temperatures from about 100° C. to 300° C. for 1-8 hours.

In the dispersion process of the present invention, the polymerized fatty acid polyamide resin is initially liquified by heating the polyamide resin to at least its melting point and more preferably to a temperature of at least 5° above its melting point but below the decomposition temperature of the polyamide resin. The liquification process is preferably conducted in a closed vessel under a protective blanket of inert gas such as nitrogen. The melting temperature of the polymerized fatty acid polyamide resin will vary considerably depending upon the particular starting reactants employed to prepare the polyamide resin. Typically, however, these polyamide resins will melt in the temperature range from somewhat below the boiling point of water to somewhat above the boiling point of water. If the the temperature to which the molten polyamide resin will be heated for liquification is above the boiling point of water, the process equipment used in the method of the present invention must be capable of being operated at elevated pressures and temperatures.

In a separate vessel, water is heated to a temperature which preferably is at least as high as the melting point of the polymerized fatty acid polyamide resin which is to be dispersed and more preferably at least about 5° higher than the melting point of the polyamide resin. Under these conditions the water may be required to be heated and maintained under pressure in order to have sufficient temperature to be higher than the melting point of the polyamide resin.

In an alternative method the water can be heated to a temperature somewhat below the melting temperature of the polymerized fatty acid polyamide and the polyamide resin heated to a temperature significantly above its melting point so that the resulting blend of the water and the polyamide resin will have a temperature above the melting point of the polyamide resin.

A surfactant is added to either the molten polymerized fatty acid polyamide resin, or to the water or to both the polyamide resin and the water in a predetermined amount. The surfactant used in the process of this invention is a cationic salt of an amine of the formula:

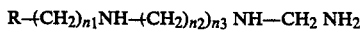

$R\text{--}(CH_2)_{n_1}NH\text{--}(CH_2)_{n_2})_{n_3}NH\text{--}CH_2NH_2$ wherein R represents an alkyl having 16-20 carbon atoms and $n_1$ and $n_2$ the same or different and each represents a whole number from 1-3 and $n_3$ is 0 or 1, and is used in an amount which will promote the emulsification of the molten polyamide resin in the water as will be explained below in greater detail and which will also act to stabilize the final dispersion of the polyamide resin in the water. These substrates are commercially available under various trademarks including Jetamine D-20, Jetamine DT, and Jetamine TRT (Jetco Chemicals).

The surfactants utilized in the present invention as indicated above are added either to the molten polyamide resin or to the water to be used in the emulsification process. The surfactant, however, is preferably added to the water because of the relative ease of addition. The relative amount of surfactant employed is based on the amount of the polymerized fatty acid polyamide resin which is to be present in the final dispersion and on the particular surfactant used. It has been found, however, that optimum results are obtained when the surfactant is used in an amount from about 0.2 to about 2 percent by weight based on the weight of the polymerized fatty acid polyamide resin.

In carrying out the process of the present invention the liquified polymerized fatty acid polyamide resin, the heated water and the surfactant are blended together in a predetermined ratio while maintaining the temperature of the individual components and the mixture which is obtained above the melting point of the polymerized fatty acid polyamide resin. In this regard, it is important that the equipment utilized in the initial blending step likewise be heated to appropriate temperatures to prevent the premature deposition of liquified polyamide resin on the equipment and a cooling of the blend of materials. The molten polymerized fatty acid polyamide resin, the water and the surfactant are blended in ratios such that the resulting mixture of materials will contain from about 20 to 60, and preferably about 50, percent by weight of the polymerized fatty acid. The mixture is subjected to comminuting forces sufficient to form a finely divided emulsion in which the droplets of the molten polmerized fatty acid polyamide resin have a volume average size distribution of 20 microns or less in diameter, and more preferably 5 or less microns in diameter. Particle size distribution can be determined by a number of methods, such as sedimentation or laser light scattering techniques. The particular type of apparatus used for applying the comminuting force to the blend of the polyamide resin, water, and surfactant to some extent is a matter of choice and can include apparatus which operates on the basis of shear, impact, or a combination of these process steps. The equipment includes commercially available apparatus such as homogenizers, submicron dispersers, emulsifiers, colloid mills, ultrasonic sound mixers and the like. In general, it is preferable for process purposes to run the blend through the comminuting equipment for one pass in that this facilitates the manufacturing process. It should be appreciated however that the blend may be sent through the comminuting equipment for a number of passes in order to obtain the smaller size droplets. In general, the smaller the size of the liquid droplets the more stable will be the resulting dispersions made from the emulsion.

The final step in the process of this invention concerns cooling down of the emulsion to a temperature below the melting point of the polymerized fatty acid polyamide resin so as to cause the finally divided droplets in the emulsion to solidify into finely divided dispersed particles. The cooling is preferably conducted in a relatively rapid fashion so as to prevent coagulation of the particles during that portion of the solidification wherein the droplets become semi-solid and highly adhesive. Cooling of the emulsions prepared at super atmospheric pressures can be rapidly performed by pumping the emulsion through a heat exchanger or the like. Alternatively, or in addition to using a heat exchanger, the cooling can be caused by evaporation of water from a reduction in the pressure.

The resulting dispersions which are obtained according to this invention are characterized by having exceptional stability. In the methods used in the prior art, when low amine, low acid number, polymerized fatty acid polyamide resins of the type used in this invention were dispersed using the salt forming technique, the resulting dispersions would rapidly separate into a cream like layer containing a high concentration of the particles of the resin and an essentially pure water layer in a matter of a few hours.

The polymerized fatty acid polyamide resins dispersion prepared in accordance with the present invention do not separate even when allowed to stand at ambient temperatures for twenty-four hours or more. Accordingly, for purposes of this specification the term "stable" refers to the stability of dispersion which when cooled to ambient temperatures, that is, room temperatures, will not separate within twenty-four hours. It has been found however that the dispersions prepared in accordance with this invention typically will be stable over extremely long periods of time with stabilities in excess of six months not being uncommon. Furthermore, the dispersions of this invention do not require that the starting polymerized fatty acid polyamide resin be initially solvated in a strong solvent or that the polyamide resin be formed with excess amine and acid groups to allow for salt formation as is required in the prior art methods of forming dispersions. A further advantage of the polyamide resin dispersions of this invention is that the dispersions, once formed, can be freeze-dried resulting in a finely divided powder which can be redispersed with minimal agitation to reform a stable dispersion. The excellent stability of the dispersions of this invention are further shown by the ability of the dispersions to undergo repeated freeze-thaw cycles without causing a breakdown on the dispersion. More importantly, however, the resulting properties of the coatings, inks, hot melt adhesives, and the like made from the dispersion of the present invention are superior in over all properties to that obtained with the dispersions made according to the prior art techniques.

The polymerized fatty acid polyamide aqueous dispersions of this invention can contain in addition to the above-noted materials various additives. One particularly useful type of additive are stabilizing agents to prevent flocculation of the polyamide resin particles. Typical stabilizers include lignin derivatives such as Indulin W-1 (Westvaco). The amount of stabilizing agent employed can vary in amounts from 0.1% to about 2% based on the weight of the polyamide resin. The polyamide dispersion may likewise contain other materials such as viscosity modifiers, plasticizers, dyes, pigments and the like. In this regard, it should be noted that the excellent stability of the polymerized fatty acid polyamide resin dispersions of this invention allow substantial loadings of additives without adversely affecting the overall stability of the polyamide resin dispersion.

The following examples are given by way of further illustration of the present invention and are not intended to limit the scope of this invention beyond that of the subjoined claims.

EXAMPLE 1

An aqueous dispersion of a polymerized fatty acid polyamide resin having a Ring and Ball softening point of 118° C. and an amine number of 7 and an acid number of 1 (commercially available as UNIREZ 2646 from Union Camp Corporation, Wayne, N.J.) was prepared as follows.

The polyamide resin was heated in a closed resin tank by means of an electrical resistance heater to a temperature of 181° C. at which point the polyamide was completely liquified.

In a separate tank an aqueous solution containing 0.9 percent Jetamine DT (commercially available from Jetco Chemical Inc., Corsicana, TX) an amount of aqueous hydrochloric acid sufficient to convert the Jetamine DT to its cationic form and about 0.1 percent of Indulin W-1 (a stabilizer available from Westvaco, North Charleton Heights, S.C.) was heated to 112° C.

The liquified polyamide resin and the aqueous solution were initially blended together in a mixing tee in about equal weight proportions with the resulting temperature of the mixture being about 125° C. The crude emulsion was then fed to a Charlotte colloid mill, Model G-5, and subjected to a single pass through the mill. The resulting emulsion was cooled in a heat exchanger to below 100° C. and then allowed to cool to ambient temperature while standing. The resulting aqueous emulsion contained 43 percent by weight of the polyamide resin. The particles of the resin in this dispersion had a volume average size distribution of 10 percent particles less than 1.1 microns, 50 percent particles less than 2.0 microns, and 90 percent of the particles less than 3.9 microns. The resulting aqueous dispersion was allowed to stand without agitation for a period of 21 days. At the end of this period the dispersion was examined and found to have a uniform distribution of particles throughout the aqueous phase showing that the dispersion was stable.

The resulting dispersion was then utilized as a hot melt adhesive wherein the dispersion was applied to a paper web and heat-sealed to a fabric in a drying oven to form an effective adhesive bond between the paper and the fabric.

EXAMPLE 2

The procedure of Example 1 was repeated with the exception that the polyamide resin, the water, and the surfactant were initially mixed together into a single mixture and then heated to 200° C. as opposed to being separately heated. The mixture was exposed to sufficient high shear forces to emulsify the liquified resin. The resulting product was essentially the same as that obtained in accordance with the procedure of Example 1 with the exception that the particle size distribution in the final emulsions was somewhat larger.

EXAMPLE 3

(Comparative Example)

The process of Example 1 was repeated with the exception that an amount of sodium hydroxide equivalent to the acid number was used in place of the surfactant. It was noted that in the emulsification process resulting emulsions were quite poor. Following through with the emulsions, it was found that the resulting dispersions of the polyamide product were quite unstable as formed and rapidly separated in less than four hours at ambient temperatures.

What is claimed is:

1. A method for the preparation of a stable aqueous dispersion of a non-solvated, un-neutralized, low acid number, low amine number, polymerized fatty acid polyamide resin, said method comprising the steps of:
   (a) heating the polyamide resin to at least the melting point thereof, thereby liquifying the polyamide resin
   (b) providing a cationic surfactant which is the salt of the amine of the formula:

$$R\text{—}NH\text{—}(CH_2)_{n1}\ (NH\text{—}(CH_2)_{n2})_{n3}NH_2$$

wherein R represents an alkyl having 16-20 carbon atoms and $n_1$ and $n_2$ are the same or different and each represents a whole number from 1-3 and $n_3$ is 0 or 1.

(c) mixing the liquified polyamide resin, an amount of the surfactant which is effective in forming an emulsion of the liquified polyamide resin in water and stabilizing a dispersion of solidified particles of the polyamide resin in water, and a predetermined amount of water having a predetermined temperature, said predetermined amount of water being selected so that the resulting mixture contains from about 20 percent to about 60 percent by weight of the polyamide resin and said predetermined temperature being selected so that the resulting mixture has a temperature which is at least as high as the melting temperature of the polyamide resin.
  (d) subjecting the mixture of the polyamide resin, surfactant and water to comminuting forces sufficient to cause the formation of an emulsion containing droplets of the liquified polyamide resin in the water having a volume average size distribution which is less than 20 microns and
  (e) cooling the emulsion to a temperature which is less than the melting temperature of the polyamide resin whereby the polyamide resin solidifies as finely divided particles in a water phase to thereby form a stable aqueous dispersion of the polyamide resin.

2. The method according to claim 1 wherein the acid number is less than about 12 and the amine number is less than about 10.

3. The method according to claim 1 wherein the polyamide resin is heated to a temperature which is at least 5 degrees above the melting temperature of the polyamide resin.

4. The method according to claim 1 wherein the water is heated to a predetermined temperature which is at least the melting temperature of the polyamide resin.

5. The method according to claim 1 wherein the water is heated to a predetermined temperature which is at least about 5 degrees above the melting temperature of the polyamide resin.

6. The method according to claim 1 wherein the surfactant is present in an amount from about 0.2 to about 2.0 percent by weight based on the weight of the polyamide resin.

7. The method according to claim 1 wherein the emulsion is formed with droplets having a volume average particle size distribution of less than 5 microns.

8. The method according to claim 1 wherein the comminuting to form the emulsion is conducted at super atmospheric pressures and cooling is conducted by passing the emulsion through a heat exchanger.

9. A method for the preparation of a stable aqueous dispersion of a non-solvated, unneutralized, low acid, low amine number of polymerized fatty acid polyamide resins which comprises the steps of:
  (a) providing a mixture comprised of the polyamide resin in a solidified form, a surfactant which is the salt of the amine of the formula:

wherein R represents an alkyl having 16-20 carbon atoms and $n_1$ and $n_2$ are the same or different and each represents a whole number from 1-3 and $n_3$ is 0 or 1, and water; said polyamide resin being present in an amount from about 20 to 60 percent by weight of the total mixture and said surfactant being present in an amount which is effective in forming an emulsion of the liquified polyamide resin and water and stabilizing a dispersion of solidified particles of the polyamide resin in water
  (b) heating the mixture to a temperature which is at least as high as the melting point of the polyamide resin whereby the polyamide resin is liquified
  (c) subjecting the mixture to comminuting forces sufficient to cause the formation of an emulsion containing droplets of the liquified polyamide resin in the water having a volume average size distribution which is less than 20 microns in diameter
  (d) cooling the emulsion temperature below the melting temperature of the polyamide resin whereby the polyamide resin is solidified as finely divided particles having a volume average particle size distribution which is less than 20 microns in diameter to form a stable aqueous dispersion of said polyamide resin in the water.

* * * * *